United States Patent
Ljung

(10) Patent No.: US 11,483,812 B2
(45) Date of Patent: Oct. 25, 2022

(54) BASE STATION CONTROLLED BEAM MANAGEMENT

(71) Applicant: Sony Mobile Communications Inc., Tokyo (JP)

(72) Inventor: Rickard Ljung, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/475,416

(22) PCT Filed: Jan. 5, 2018

(86) PCT No.: PCT/EP2018/050261
§ 371 (c)(1),
(2) Date: Jul. 2, 2019

(87) PCT Pub. No.: WO2018/127560
PCT Pub. Date: Jul. 12, 2018

(65) Prior Publication Data
US 2019/0335430 A1 Oct. 31, 2019

(30) Foreign Application Priority Data

Jan. 9, 2017 (EP) .................................. 17150723
Feb. 3, 2017 (EP) .................................. 17154645
Jun. 16, 2017 (EP) .................................. 17176443

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/0695* (2013.01); *H04B 7/088* (2013.01);
(Continued)

(58) Field of Classification Search
CPC ..... H04W 72/042; H04W 8/22; H04W 16/28; H04W 72/044; H04W 72/0453; H04B 7/0695; H04B 7/088; H04L 5/0048
(Continued)

(56) References Cited

U.S. PATENT DOCUMENTS

| 2013/0045690 | A1* | 2/2013 | Seol | H04B 7/0628 455/63.4 |
| 2013/0223251 | A1* | 8/2013 | Li | H04B 7/0619 370/252 |
| 2013/0272220 | A1* | 10/2013 | Li | H04B 7/0848 370/329 |

(Continued)

FOREIGN PATENT DOCUMENTS

| EP | 1562306 A1 | 8/2005 |
| JP | 2019512919 A | 5/2019 |

(Continued)

OTHER PUBLICATIONS

International Search Report and Written Opinion from corresponding International Patent Application No. PCT/EP2018/050261 dated Apr. 16, 2018; 12 pages.
(Continued)

*Primary Examiner* — Obaidul Huq
(74) *Attorney, Agent, or Firm* — Tucker Ellis LLP

(57) ABSTRACT

A method of operating a network node comprises receiving, from a communication device, a beamforming capability of the communication device; and determining configuration information for one or more beams based on the beamforming capability; and transmitting, to the communication device, the configuration information for one or more beams; and communicating at least one pilot signal on the one or more beams and in accordance with the configuration information.

19 Claims, 12 Drawing Sheets

(51) Int. Cl.
*H04W 8/22* (2009.01)
*H04W 16/28* (2009.01)
*H04B 7/06* (2006.01)
*H04B 7/08* (2006.01)

(52) U.S. Cl.
CPC .............. *H04L 5/0048* (2013.01); *H04W 8/22* (2013.01); *H04W 16/28* (2013.01); *H04W 72/044* (2013.01); *H04W 72/0453* (2013.01)

(58) Field of Classification Search
USPC .......................................... 370/310, 328, 329
See application file for complete search history.

(56) References Cited

U.S. PATENT DOCUMENTS

| | | |
|---|---|---|
| 2013/0272263 A1 | 10/2013 | Pi et al. |
| 2013/0301454 A1 | 11/2013 | Seol et al. |
| 2016/0021548 A1 | 1/2016 | Raghavan et al. |
| 2018/0091196 A1* | 3/2018 | Frenne .................... H04L 5/005 |
| 2018/0123648 A1* | 5/2018 | Nagaraja ................ H04B 17/15 |
| 2018/0351624 A1* | 12/2018 | Hakola ................ H04B 7/0632 |
| 2019/0215045 A1* | 7/2019 | Choi ....................... H04B 7/088 |

FOREIGN PATENT DOCUMENTS

| | | |
|---|---|---|
| WO | 2011042045 A1 | 4/2011 |
| WO | 2015080648 A1 | 6/2015 |
| WO | 2016010685 A1 | 1/2016 |
| WO | 2016086144 A1 | 6/2016 |
| WO | 2016095110 A1 | 6/2016 |
| WO | 2017151876 A1 | 9/2017 |

OTHER PUBLICATIONS

3GPP TSG RAN WG1 #89 Document R1-1709773, May 15-19, 2017, 6 pages.

Asustek, "Beam Management in NR", 3rd Generation Partnership Project (3GPP), Nov. 14-18, 2016, Reno, USA, R2-168207, 6 pages.

InterDigital Communications, "Considerations on measurement RS design for NR", 3rd Generation Partnership Project (3GPP), Oct. 10-14, 2016, Lisbon, Portugal, R1-1609910, 4 pages.

LG Electronics, "Discussion on UL Beam Management", 3rd Generation Partnership Project (3GPP), May 15-19, 2017, Hangzhou, China, R1-1707605, 6 pages.

InterDigital Inc., "On Efficient UL Beam Management", 3rd Generation Partnership Project (3GPP), May 15-19, 2017, Hangzhou, China, R1-1708335, 3 pages.

Ericsson, "UL Beam Management Details", 3rd Generation Partnership Project (3GPP), May 15-19, 2017, Hangzhou, China, R1-1708677, 3 pages.

Office Action from corresponding Chinese Application No. 201880006027.8 dated Nov. 29, 2021.

* cited by examiner

BASE STATION CONTROLLED BEAM MANAGEMENT

TECHNICAL FIELD

Various examples of the invention generally relate to communicating at least one pilot signal on one or more beams. Various examples of the invention specifically relate to determining and providing configuration information for said communicating of the at least one pilot signal on the one or more beams.

BACKGROUND

Beamforming techniques are becoming increasingly popular for wireless transmission. One advantage of beamforming is the compatibility with transmission on high carrier frequencies, e.g., above 6 GHz and even up to 60 GHz or beyond. Large bandwidths may be achieved. Another advantage of beamforming is the availability of spatial multiplexing, thereby increasing spectral efficiency.

Various applications of beamforming are envisioned in the Third Generation Partnership Project (3GPP) New Radio (NR) or 5G communication system.

Within the scope of 3GPP NR, the devices—such as terminals/user equipments (UEs) and base stations (BS)—shall be able to communicate with significantly higher radio frequencies than the existing 3GPP standards such as Wideband Code Division Multiple Access (WDCMA) and Long Term Evolution (LTE). Examples of such higher frequencies are within 20-40 GHz, in addition to the communication bandwidths around 1-2 GHz that are specified for the legacy 3GPP standards. The higher frequencies are sometimes referred to as "mmWave" frequencies, since the wavelength is approaching same order of magnitudes as a millimeter.

When communicating at these high frequencies and thereby small bandwidths, the dimensions of each antenna element become quite small. There is therefore an opportunity to include many more antenna elements for mmWave communication into a single device for a given physical size of an antenna patch—sometimes also referred to as module or panel—, than it would for a e.g. 1 GHz modem. Also, since the radio propagation loss is scaled with frequency, a high antenna gain is required to provide reasonable system coverage when communicating using mmWave frequencies.

All in all, this results in typical implementations on both transmitter and receiver sides where the antenna patches are combining phased-array transmissions/receptions with multiple antenna elements for the same data stream, efficiently creating an antenna directivity. Here, the antenna gain in a certain direction is often several dB:s higher than the gain from a single antenna element. The phase-coherent superposition of transmitting and/or receiving (communicating) on a plurality of antenna elements of an antenna patch is referred to as beamforming. The amplitude and phase relationship between the different antenna elements are specified by a set of antenna weights, where each antenna weight is indicative of the amplitude and phase of a given antenna element of an antenna patch. Different sets of antenna weights are associated with different beams; beams may differ in terms of direction, beam width, etc. By changing the set of antenna weights or alternate between using different antenna elements to form beams, it is possible to switch between different beams (beam switching).

Beamforming may generally be employed for receiving signals (receive beamforming) and/or for transmitting signals (transmit beamforming).

When using beamforming, the direction of the beam may have a significant impact on the link performance. This is because of the transmission characteristics varying for different spatial propagation paths that are defined by the beams. For example, a particular low path loss may be expected for transmission along a line-of-sight spatial propagation channel. Generally, a beam directed in the right direction will improve the link budget with many dB:s. To switch to the appropriate beam, sometimes, beam sweeps are employed.

In a beam sweep, one or more pilot signals are transmitted—either in sequence or at least partly in parallel, e.g., using frequency-division duplexing (FDD)—on one or more beams; based on a receive property of the pilot signal, it is then possible to identify the appropriate beam. Beam management may include signaling methods to support selecting a proper beam configuration, or indicating that beam switching is needed etc. Beam management may include the routine for repeated beam sweeps to avoid a degradation of the link performance.

A beam sweep may be performed within a certain duration; the duration may be sufficiently small to avoid changes to the link performance during the duration of the beam sweep. For example, the at least one pilot signal may be transmitted on all beams of a beam sweep within a duration that is not larger than 5 s, optionally not larger than 2 s, further optionally not larger than 500 ms. For example, a beam sweep may be concluded within the duration corresponding to one or more frames of a transmission protocol, each frame including a plurality of time-frequency resources.

When a UE is in idle mode—i.e., pageable by the network, but not maintaining a data connection—, the UE can handle its beam management on its own, i.e., autonomously select the appropriate beam. The UE will be able to listen to broadcasted signals from one or more BSs and broadcasted signals may also come from different beams of the BS. During this process, the UE is still in full control of the beam selection for its own Rx beams.

In connected mode, however, a data connection is maintained between the UE and the network and the UE is in many ways controlled by the BS. The beam management signaling allows the UE to report that another beam is better, and the BS to require that the UE shall switch beams. The BS may also control whether a UE shall make a handover to another cell, and such decisions are based on UE measurements. The BS can e.g. request the UE to report the detected signal strength for other neighbor cells.

3GPP TSG RAN WG1 #89 document R1-1709773 discloses that a notification from a BS is provided which includes information indicating whether UE should keep the same transmit beams or to use different transmit beams for sounding reference signal transmissions.

SUMMARY

A need exists for advanced techniques of beamforming. This need is met by the features of the independent claims. The dependent claims define embodiments.

This need is met by the features of the independent claims. The features of the dependent claims define embodiments.

A method of operating a network node includes receiving, from a communication device, a beamforming capability of the communication device. The method further includes determining configuration information for one or more beams based on the beamforming capability. The method further includes transmitting, to the communication device, the configuration information for one or more beams. The method further includes communicating at least one pilot signal on the one or more beams and in accordance with the configuration information.

A computer program product includes program code. The program code may be executed by at least one processor. Executing the program code causes the at least one processor to perform a method. The method includes receiving, from a communication device, a beamforming capability of the communication device. The method further includes determining configuration information for one or more beams based on the beamforming capability. The method further includes transmitting, to the communication device, the configuration information for one or more beams. The method further includes communicating at least one pilot signal on the one or more beams and in accordance with the configuration information.

A computer program includes program code. The program code may be executed by at least one processor. Executing the program code causes the at least one processor to perform a method. The method includes receiving, from a communication device, a beamforming capability of the communication device. The method further includes determining configuration information for one or more beams based on the beamforming capability. The method further includes transmitting, to the communication device, the configuration information for one or more beams. The method further includes communicating at least one pilot signal on the one or more beams and in accordance with the configuration information.

A network node includes at least one processor configured to perform: receiving, from a communication device, a beamforming capability of the communication device; and determining configuration information for one or more beams based on the beamforming capability; and transmitting, to the communication device, the configuration information for one or more beams; and communicating at least one pilot signal on the one or more beams and in accordance with the configuration information.

A method of operating a communication device includes transmitting, to a network node, a beamforming capability of the communication device. The method further includes receiving, from the network node, a configuration information for one or more beams. The method further includes communicating at least one pilot signal on the one or more beams and in accordance with the configuration information.

A computer program product includes program code. The program code may be executed by at least one processor. Executing the program code causes the at least one processor to perform a method. The method includes transmitting, to a network node, a beamforming capability of the communication device. The method further includes receiving, from the network node, a configuration information for one or more beams. The method further includes communicating at least one pilot signal on the one or more beams and in accordance with the configuration information.

A computer program includes program code. The program code may be executed by at least one processor. Executing the program code causes the at least one processor to perform a method. The method includes transmitting, to a network node, a beamforming capability of the communication device. The method further includes receiving, from the network node, a configuration information for one or more beams. The method further includes communicating at least one pilot signal on the one or more beams and in accordance with the configuration information.

A communication device includes at least one processor configured to perform: transmitting, to a network node, a beamforming capability of the communication device; and receiving, from the network node, a configuration information for one or more beams; and communicating at least one pilot signal on the one or more beams and in accordance with the configuration information.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
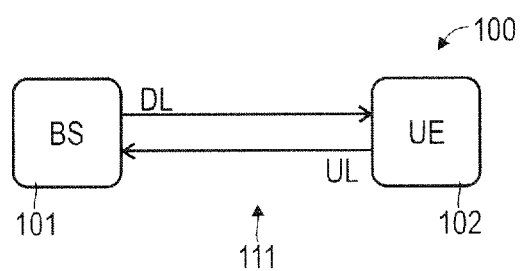
FIG. 1 schematically illustrates a network including a UE and the BS according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network including multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

The techniques described herein may facilitate determining beams used for transmission of data—e.g., payload data such as application data or control data such as Layer 2 or Layer 3 control data. As such, the techniques described herein may generally facilitate efficient beamforming. Facilitating beamforming may, in turn, facilitate spatial multiplexing and high bandwidths, e.g., above 6 GHz or 10 GHz or even above 50 GHz. By using a certain set of antenna weights, a well-defined spatial profile of the wireless transmission via the plurality of antenna elements may be obtained, typically referred to as a beam. The beam may thus define a directivity of transmitting and/or receiving. The spatial profile may define a certain width and amplitude of the beam. The spatial profile may define side lobes which may be suppressed if compared to a central peak of the beam. The spatial profile may be associated with a propagation channel of the respective signals; here, the propagation channel may include one or more reflections, etc.

The techniques described herein may facilitate determining beams by communicating one or more pilot signals on a plurality of beams. Hence, the techniques described herein may facilitate determining beams by using a beam sweep. The beam sweep helps to identify such beams which are appropriate for communicating payload data.

The techniques described herein may facilitate a beam management at the UE which is, at least partly, remote controlled by the network. For example, the BS may remote control the beam management; albeit, in general, other nodes of the core of the network may implement such remote control functionality. Hereinafter, for sake of simplicity, reference is primarily made to the BS remote controlling the beam management at the UE.

For example, various techniques described herein may be applied in connected mode in which the UE and the network maintain a data connection and UE mobility including handovers is actively controlled. In some examples, it would also be possible to apply the techniques described herein to idle mode.

According to examples, a beamforming capability of the UE is signalled from the UE to the BS. For example, an uplink (UL) control message may be transmitted and/or received (communicated); the UL control message including the beamforming capability of a UE. Then, the BS determines configuration information for one or more beams based on the beamforming capability. As such, the BS may determine configuration information for one or more beam sweeps based on the beamforming capability. Next, the beamforming capability is signaled from the BS to the UE. For example, a downlink (DL) control message may be communicated which includes this configuration information for the one or more beams. Then, at least one pilot signal is communicated on the one or more beams and in accordance with the respective configuration information.

The one or more beams may implement one or more beam sweeps. The one or more beams may help to sound the wireless link between the UE and the BS.

By such techniques, it is possible to include decision logic for configuring the communication of the at least one pilot signal at the BS. The BS may, at least partly, command the UE on how to implement the communication of the at least one pilot signal. The beam management at the UE may thereby be remote controlled, e.g., by the BS.

Such techniques may be applicable to communication of at least one DL pilot signal. Alternatively or additionally, such techniques may be applicable to the communication of at least one UL pilot signal. Generally, the UE may implement receive beamforming and/or transmit beamforming in accordance with the respective configuration information.

Various techniques described herein are based on the finding that there are currently no techniques available for a BS to control the beam management in general. It is expected that such control of the beam management by the BS may be, in particular, helpful when the UE is operating in connected mode, i.e., with a data connection being established. For example, if the UE limits the beam sweeps to a certain opening angle directed towards a specific direction, the UE would not be able to detect a stronger signal from another direction not included in the certain opening angle. For example, according to the techniques described herein, it would be possible for the BS to control the UE to implement a certain frequency of occurrence with which the UE implements a global beam sweep which has an omnidirectional or almost omnidirectional opening angle.

As such, generally, network control of a timing, or specifically a frequency of occurrence, of a global beam sweep can be implemented, e.g., for UE receive channel measurements when communicating downlink pilot signals and/or for UE transmit channel measurements when communicating UL pilot signals.

FIG. 1 schematically illustrates a wireless communication network 100 that may benefit from the techniques disclosed herein. The network may be a 3GPP-standardized network such as 3G, 4G, or upcoming 5G NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-10T or eMTC networks.

The network 100 includes a BS 101 and a UE 102. A wireless link 111 is established between the BS 101—e.g., a gNB in the 3GPP NR framework—and the UE 102. The wireless link 111 includes a DL link from the BS 101 to the UE 102; and further includes an UL link from the UE 102 to the BS 101. Time-division duplexing (TDD), frequency-division duplexing (FDD), and/or code-division duplexing (CDD) may be employed for mitigating interference between UL and DL. Likewise, TDD, FDD, and/or CDD may be employed for mitigating interference between multiple UEs communicating on the wireless link 111 (not shown in FIG. 1).

The UE 102 may be one of the following: a smartphone; a cellular phone; a table; a notebook; a computer; a smart TV; an MTC device; an eMTC device; an IoT device; an NB-IoT device; a sensor; an actuator; etc.

Figure 2:
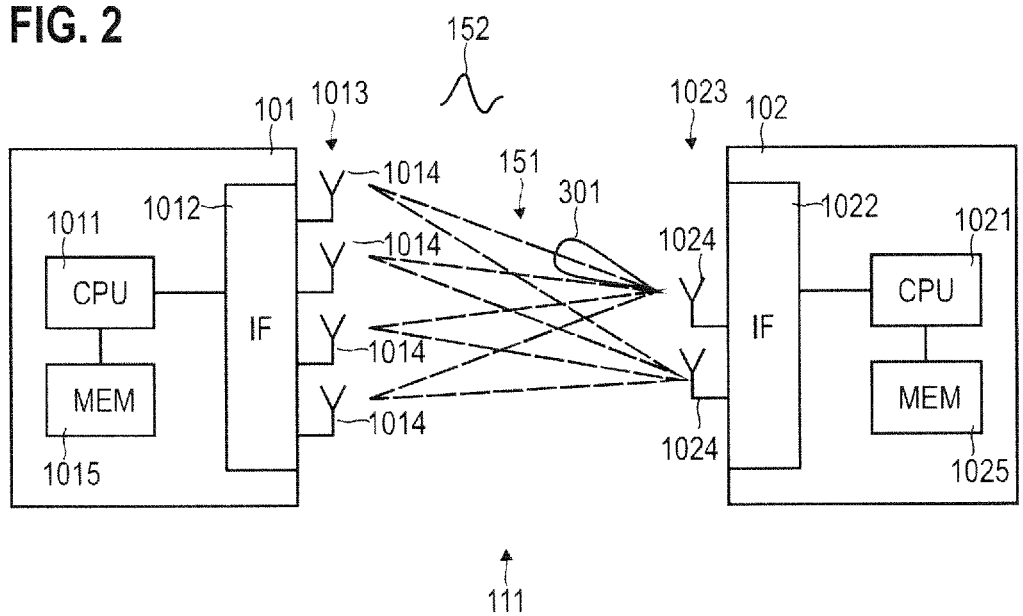
FIG. 2 schematically illustrates the network of FIG. 1 in greater detail.

FIG. 2 schematically illustrates the BS 101 and the UE 102 in greater detail. The BS 101 includes a processor 1011 and an interface 1012, sometimes also referred to as frontend. The interface 1012 is coupled via antenna ports (not shown in FIG. 2) with an antenna patch 1013 including a plurality of antennas 1014. In some examples, the antenna patch 1013 may include at least 30 antennas 1014, optionally at least 110 antennas, further optionally at least 200 antennas. Sometimes, a scenario implementing a large number of antennas 1014 is referred to as full dimension multi-input multi-output (FD-MIMO) or massive multi-input multiple-output (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern.

The BS 101 further includes a memory 1015, e.g., a non-volatile memory. The memory may store program code that can be executed by the processor 1011. Executing the program code may cause the processor 1011 to perform techniques with respect to communicating one or more pilot signals, beam sweeps, and remote controlling UE beam management as disclosed herein. Thus, the processor 1011 and the memory 1015 form a control circuit.

The UE 102 includes a processor 1021 and an interface 1022, sometimes also referred to as frontend. The interface 1022 is coupled via antenna ports (not shown in FIG. 2) with an antenna patch 1023 including a plurality of antennas 1024. In some examples, the antenna patch 1023 may include at least 6 antennas, optionally at least 16 antennas, further optionally at least 32 antennas. Generally, the antenna patch 1023 of the UE 102 may include fewer antennas 1024 than the antenna patch 1013 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern.

The UE 102 further includes a memory 1025, e.g., a non-volatile memory. The memory 1025 may store program code that can be executed by the processor 1021. Executing the program code may cause the processor 1021 to perform techniques with respect to communicating one or more pilot signals, beam sweeps, and beam management as described herein. Thus, the processor 1021 and the memory 1025 form a control circuit.

FIG. 2 also illustrates aspects with respect to propagation channels 151. FIG. 2 schematically illustrates that different propagation channels 151 (dashed lines in FIG. 2) are implemented on the wireless link 111. The different propagation channels 151 are associated with different beams 301 (in FIG. 2, for sake of simplicity, only a single beam implemented by the UE 102 is illustrated). For example, to implement a certain propagation channel 151 for DL communication, a certain DL transmit beam may be selected for the antenna patch 1013 of the BS 101. Here, the beam may generally be implemented by certain antenna weights of the antennas 1014, 1024/antenna ports of the respective antenna patch 1013, 1023. Sometimes, the antenna weights are also referred to as steering vectors. Accordingly, different beams 301 may be addressed by using different amplitude and phase configurations for the various antennas 1014, 1024/ antenna ports of the respective antenna patches 1013, 1023.

While in FIG. 2 only line-of-sight propagation channels 151 are illustrated, in other examples, non-line-of-sight propagation channels 151 are possible.

Different ones of the propagation channels 151 may have different transmission characteristics such as number of reflections, path loss, and generally transmission reliability and/or capacity. In particular, different propagation channels 151 can have different fading profiles at the position of the respective receiver. Fading typically occurs due to destructive interference of reflected electromagnetic waves carrying the signals at the position of the receiver. Thus, the link performance will vary significantly depending on the selected beam 301/propagation channel 151. By using appropriate propagation channels 151—by selecting the appropriate beam—, diversity can be provided to reduce fading. According to various examples described herein, selection of the appropriate propagation channels 151 is facilitated through tailored beam management. The appropriate beam for transmission and/or reception is selected.

Generally, such multi-beam operation is expected to be used in NR networks operated at carrier frequencies above 6 GHz. Here, the beam from both BS 101 and UE 102 should be aligned to avoid signal loss. To sound the wireless link 111 and the various propagation channels 152, one or more pilot signals 152 can be transmitted and received along the various propagation channels 152. For this, a beam sweep can be used. In multi-beam operation, beam sweeping operation can be required, particularly in scenarios where there is no or limited transmit/receive reciprocity at the BS 101 and/or at the UE 102.

Such pilot signals as described herein may generally have a well-defined symbol sequence and/or transmission power such that based on a receive property of the pilot signals that this possible to sound the wireless link. Sometimes, the pilot signals may also be referred to as reference signals or synchronization signals.

Herein, techniques are disclosed which enable to determine a beam used for transmission of payload data which provides favorable transmission characteristics. This is done based on one or more beam sweeps. In a beam sweep, one or more beams are activated contemporaneously and/or subsequently to find out which one of the one or more beams corresponds to a propagation channel 151 having favorable transmission characteristics. A beam sweep may even be implemented by communicating one or more pilot signals using a beam having an omnidirectional directivity, i.e., a 360° beam width.

Figure 3:
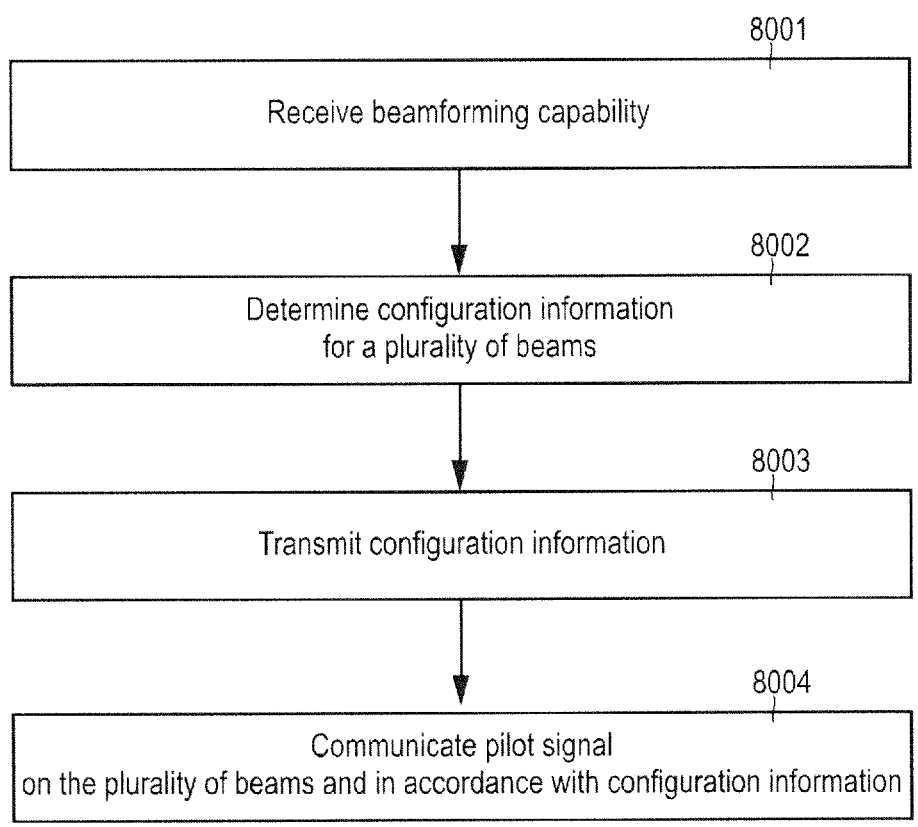
FIG. 3 is a flowchart of a method according to various examples.

FIG. 3 is a flowchart of a method according to various examples. For example, the method according to FIG. 3 could be executed by the processor 1011 of the BS 101.

In block 8001, a beamforming capability of the UE is received, e.g., using an UL control message.

For example, the beamforming capability of the UE may indicate whether the UE is, generally, capable to implement beamforming. For example, the beamforming capability may indicate a number of antennas of the UE. For example, the beamforming capability may indicate a number of antenna patches of the UE. For example, the beamforming capability may indicate a per-panel number of antennas in each antenna patch of the UE. For example, the beamforming capability may indicate, for each patch of a plurality of patches of the UE, how many antennas are provided at the respective antenna patch. Such information may be implicitly indicative of the number and type of candidate beams supported by the UE. It would also be possible that the beamforming capability is explicitly indicative of a plurality of candidate beams supported by the UE, optionally providing an individual index for each of the candidate beams. For example, the beamforming capability may be indicative of a relative spatial arrangement of the plurality of candidate beams with respect to each other. For example, alternatively or additionally, the beamforming capability could be indicative of the beam width of the plurality of candidate beams. Alternatively or additionally, the beamforming capability could be indicative of antenna patches associated with the plurality of candidate beams. For example, the beamforming capability may be indicative of whether the UE can communicate one or more pilot signals contemporaneously with payload data—or whether time gaps (measurement gaps) are required while communicating the one or more pilot signals. For example, the beamforming capability may be indicative of a FDD capability of the UE. For example the beamforming capability may indicate a grouping of the supported beams, defining e.g. an individual index identifying one or more beams that forms each group so that each index may refer to the group of beams.

For example, the beamforming capability may state the number of antenna patches: e.g., there could be three patches A, B, and C, wherein patch A has 6 antennas, patch B has 2 antennas, and patch C has 7 antennas. This information could be indicated by the beamforming capability. For example, the beamforming capability could indicate the relative spatial arrangement of the patches, e.g., an angle between the surface normal vectors of the patches.

In block 8002, configuration information for one or more beams is determined. For example, the one or more beams may correspond to one or more beam sweeps to be used for communicating at least one pilot signal.

For example, the configuration information may be indicative of whether a global beam sweep is to be implemented by the one or more beams. The configuration information may thus be indicative of whether a global beam sweep is required. A global beam sweep may be characterized by the maximum supported opening angle. For example, a global beam sweep may be characterized by an opening angle which is larger than 180°, optionally 270°, further optionally 350°. A global beam sweep may facilitate beam recovery, e.g., if synchronization between the BS and the UE is lost and no appropriate spatial propagation channel is known. For example the configuration information may be indicative of whether a beam sweep is to be implemented by using a specific set of beams. This configuration information may be indicative of individual beam indexes, or beam group indexes.

The configuration information may be indicative of a timing used for communicating one or more pilot signals on the one or more beams.

Here, the configuration information may indicate the one or more beams in some examples. For example, the configuration information may indicate the one or more beams which implement the global beam sweep. In other examples, it is not required that the configuration information indicates the one or more beams; here, the UE may have the authority to select the appropriate beams to implement the global beam sweep.

For example, the one or more beams may be a subset of the candidate beams indicated in block 8001 by means of the beamforming capability. Hence, determining a configuration information may correspond to a selection of the one or more beams from the plurality of candidate beams.

Alternatively or additionally, the configuration information may be indicative of a plurality of resources in at least one of time domain and frequency domain and allocated to said communicating of the one or more pilot signals on the one or more beams. For example, reoccurring resources may be indicated. Thereby, it may be possible to specify a frequency of occurrence of communicating the at least one pilot signal on the one or more beams.

For example, it would be possible that the resources are allocated to the one or more beams depending a relative spatial arrangement of the one or more beams; beam widths of the one or more beams; and antenna patches associated the one or more beams. For example, it would be possible that such beams associated with the same antenna patch are allocated shared resources. Alternatively, it would be possible that such beams associated with different antenna patches are allocated shared resources.

In some examples, instead of allocating resources for specifying the frequency of occurrence of communicating the at least one pilot signal on the one or more beams, it would also be possible to more generally specify a timing of said communicating of the at least one pilot signal on the one or more beams. For example, it would be possible to specify allowed time intervals between communicating the at least one pilot signal on the one or more beams. For example, it could be possible to specify the maximum allowed time in between a global beam sweep in the various examples described herein. For example, the configuration information may specify how often a global beam sweep is required. Alternatively or additionally, the configuration information could specify if all supported candidate beams of the UE should be used or a reduced set of beams should be used.

For example, the configuration information may be indicative of a temporal sequence of the one or more beams within a beam sweep. Thereby, the time alignment of one or more beams being part of a beam sweep may be set.

For example, the configuration information may be indicative of the opening angle of one or more beams within the beam sweep to be implemented by the UE. Here, the configuration information may not be indicative of specific beams to be used by the UE; rather, the UE may have the competence to select the appropriate beams from, e.g., a plurality of candidate beams which implement the indicated opening angle. Alternatively or additionally, the configuration information may be indicative of the beam widths of one or more beams.

For example, the configuration information may be indicative of time gaps of communicating payload data. The time gaps may enable the UE to communicate at least one pilot signal on one or more beams. Sometimes, a FDD capability of the UE may not allow for contemporaneously communicating at least one pilot signal on one or more beams and communicating payload data on one or more further beams. It is possible to selectively implement the time gaps depending on the beamforming capability indicated by the UE.

Next, in block 8003, the configuration information of block 8002 is transmitted, e.g., using a DL control message.

Then, in 8004, at least one pilot signal is communicated on the one or more beams and in accordance with the configuration information. Thus, it is possible that in 8004 a beam sweep is implemented. Communicating the at least one pilot signal may occur at least partly contemporaneously on different beams of the one or more beams. It would also be possible to communicate the at least one pilot signal consecutively and offset in time domain on different beams of the one or more beams.

For example, in 8004, one or more UL pilot signals—such as SRSs—may be communicated. Alternatively or additionally, in 8004, one or more DL pilot signals—such as reference signals—may be communicated.

By such techniques as illustrated in connection with the method according to FIG. 3, it is possible to control certain properties of the communicating of the at least one pilot signal on the plurality of beams by the BS. For example, a timing of communicating one or more pilot signals on the one or more beams could be specified. For example, a priority between different beams of the one or more beams could be specified, e.g., by selecting the appropriate beams from candidate beams indicated by the beamforming capability. A priority between different beams could also be specified by appropriately allocating resources to different beams of the plurality of beams. For example, certain beams which are more important in terms of communicating the at least one pilot signal may be allocated more resources and resources reoccurring more often if compared to other, less important beams. Thereby, for example, a balance between communicating the at least one pilot signal on local and global beams may be ensured.

Figure 4:
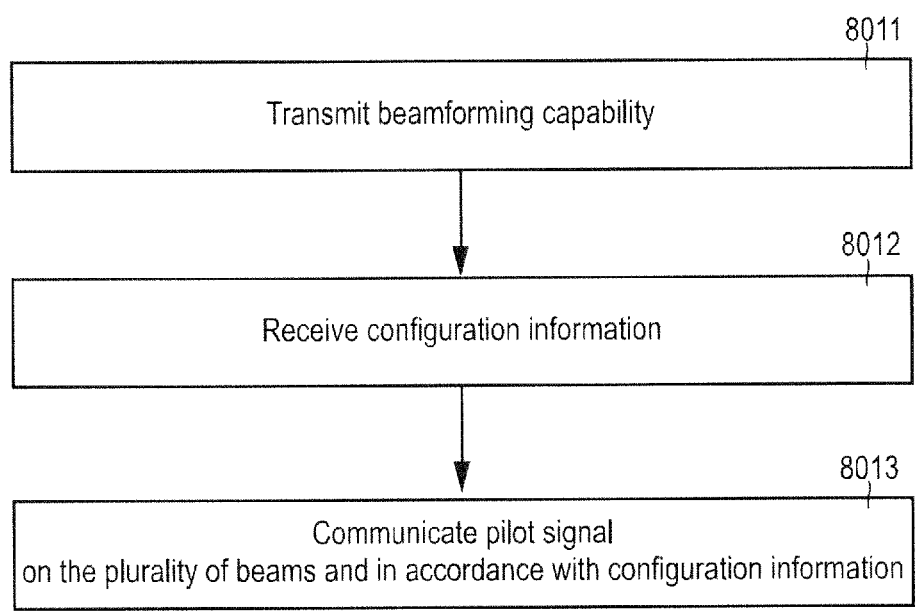
FIG. 4 is a flowchart of a method according to various examples.

FIG. 4 is a flowchart of a method according to various examples. For example, the method according to FIG. 4 could be executed by the processor 1021 of the UE 102.

Block 8011 is inter-related with block 8001 of the method according to FIG. 3.

Block 8012 is inter-related with block 8003 of the method according to FIG. 3.

Block 8013 as inter-related with block 8004 of the method according to FIG. 3.

Figure 5:
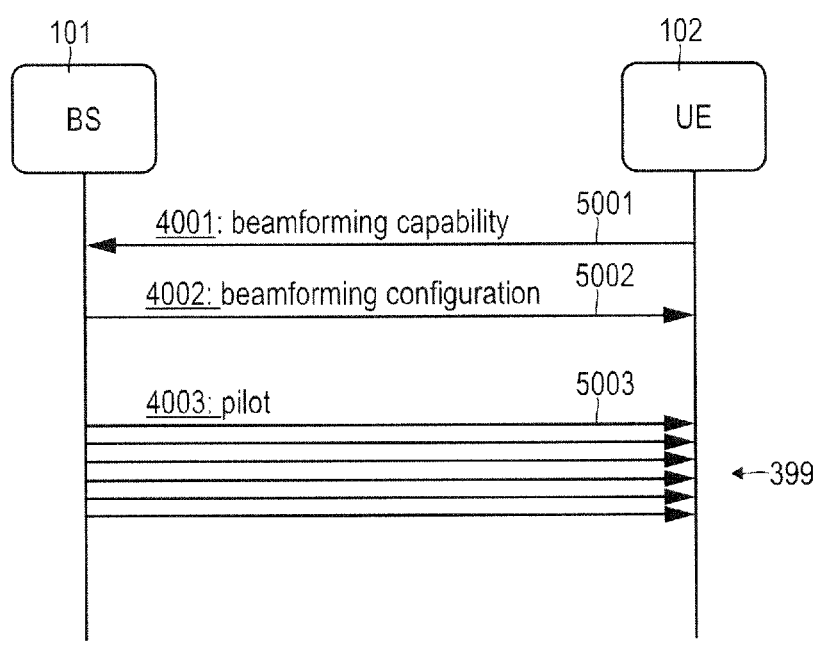
FIG. 5 is a signaling diagram of communicating between a BS and a UE according to various examples.

FIG. 5 is a signaling diagram of communication on the wireless link 111 between the UE 102 and the BS 101.

First, at 5001, a control message 4001 including a beamforming capability of the UE 102 is transmitted by the UE 102 and received by the BS 101. This may be Radio Resource Control (RRC) control signaling or specific layer 1 signaling for, e.g., SRS configuration. The BS 101 may then determine a configuration information for a plurality of beams based on the beamforming capability. In 5002, a control message 4002 is transmitted by the BS 101 and received by the UE 102. The control message 4002 includes the configuration information. The control message 4002 may be transmitted as downlink control information (DCI), cell-specific or UE-specific system information, RRC signaling, or specific SRS configuration on layer 1. It would be possible to broadcast the control message 4002.

Then, one or more DL pilot signals 4003 are transmitted in 5003 by the BS 101 and received by the UE 102. Different ones of the pilot signals 4003 are received by the UE 102 using different receive beamforming, i.e., on different beams. In particular, the UE 102 receives the one or more pilot signals 4003 on a plurality of beams for which the configuration information has been provided with the control message 4002 in 5002. This implements a receive beam sweep 399.

The communication of the one or more pilot signals 4003 may facilitate sounding of the wireless link 111. In particular, such spatial propagation paths 151 may be identified by means of a receive property of the one or more pilot signals 4003 which are appropriate for communicating payload data.

Figure 6:
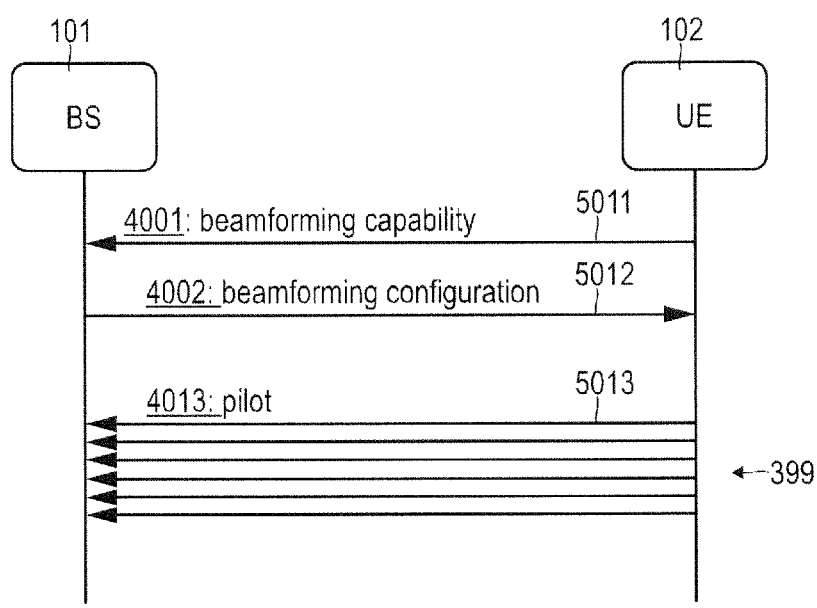
FIG. 6 is a signaling diagram of communicating between a BS and the UE according to various examples.

FIG. 6 is a signaling diagram of communication on the wireless link 111 between the UE 102 in the BS 101. The example of FIG. 6 generally corresponds to the example of FIG. 5. In particular, 5011 corresponds to 5001; and 5012 corresponds to 5002.

In 5013, one or more UL pilot signals 4013 are transmitted by the UE 102 and received by the BS 101. Different ones of the one or more UL pilot signals 4013 are transmitted by the UE 102 using different beams. In particular, the UE 102 transmits the one or more pilot signals 4013 on a plurality of beams which the configuration information has been provided with the control message 4002 in 5012.

The of the one or more pilot signals 4013 may facilitate sounding of the wireless link 111. In particular, such spatial propagation paths 151 may be identified by means of a receive property of the one or more pilot signals 4013 which are appropriate for communicating payload data.

Figure 7:
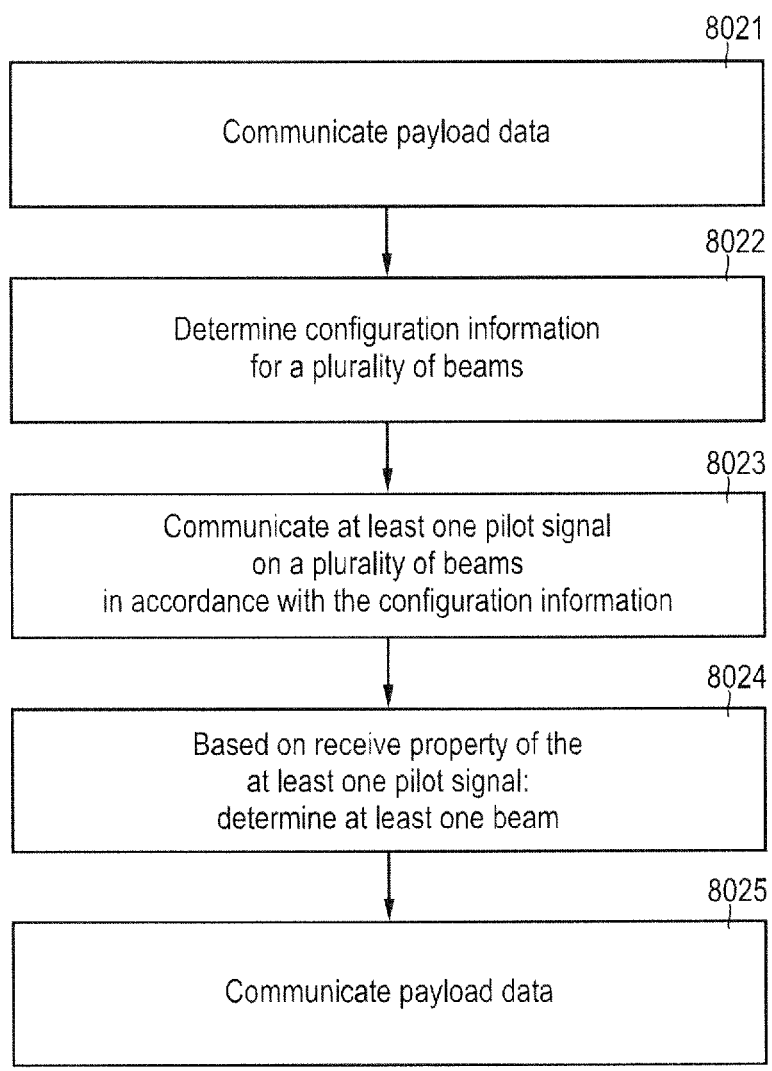
FIG. 7 is a flowchart of a method according to various examples.

FIG. 7 is a flowchart of a method according to various examples. For example, the method according to FIG. 7 could be executed by the processor 1011 of the BS 101.

First, in block 8021, payload data is communicated. For example, the payload data may be communicated along a well-defined spatial propagation path 151, i.e., by selecting an appropriate transmit beam and/or receive beam.

Then, in block 8022, configuration information is determined for a plurality of beams based on a quality of the communicating of the payload data, i.e., based on a performance of the wireless link. In other words, the beam management may depend on a quality of communicating payload data. For example, if a degradation in the quality of the communicating of the payload data is observed, it could be possible to determine the configuration information for one or more beams to obtain a beam sweep having a comparably large opening angle. For example, if no significant degradation in the quality of the communicating of the payload data is observed, it could be possible to determine the configuration information for one or more beams to obtain a beam sweep having a comparably small opening angle centered around the beams used for communicating the payload data in block 8021.

At 8023, the beam sweep is executed by communicating at least one pilot signals on one or more beams and in accordance with the configuration information of 8022. A DL control message indicative of the configuration information may be previously communicated to inform the UE accordingly (not illustrated in FIG. 7).

Next, in block 8024, at least one beam for subsequent communication of payload data is determined based on a receive property of the at least one pilot signal. This may correspond to channel sounding, i.e., a comparison of the communication characteristics of the various spatial propagation paths 151.

In block 8025, the payload data is communicated on the at least one beam determined in block 8024.

As will be appreciated from the example of FIG. 7, by implementing the beam management such that it depends on a quality of communicating payload data, it is possible to tailor one or more beam sweeps according to the needs of the communicating of the payload data. Unnecessary beam sweeps may be avoided. It can be distinguished between coarse and fine beam sweeping. The frequency of occurrence of global and local beam sweeps may be tailored. As such, a dynamic beam management may be supported, e.g., based on how often the UE reports beam management issues and/or how often the UE required to conduct beam recovery.

Figure 8:
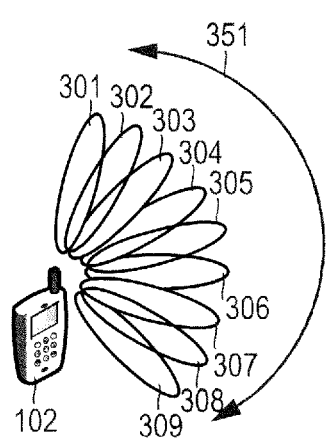
FIG. 8 schematically illustrates candidate beams supported by a UE according to various examples.

FIG. 8 illustrates aspects with respect to candidate beams 301-309 generally supported by UE 102. For example, the candidate beams 301-309 may be indicated to the BS 101 as the beamforming capability. For example, the spatial arrangement—e.g., relative with respect to each other or relative with respect to reference frame—of the candidate beams 301-309 may be indicated to the BS 101 as the beamforming capability. For example, the count of the beams 301-309 may be indicated to the BS 101 as the beamforming capability. For example, the antenna patch associated with the candidate beams 301-309 may be indicated to the BS 101 is the beamforming capability.

The beams 301-309 may be referred to as pencil beams, because they all have a comparably small beam width. In FIG. 8, the opening angle 351 that may be achieved by transmitting on all beams 301-309—e.g., in a beam sweep—is illustrated. For example, the beams 311-313 may be associated with antennas 1024 arranged on a common antenna patch 1023, because they are all arranged in the same direction (left of the UE 102 in FIG. 8).

Figure 9:
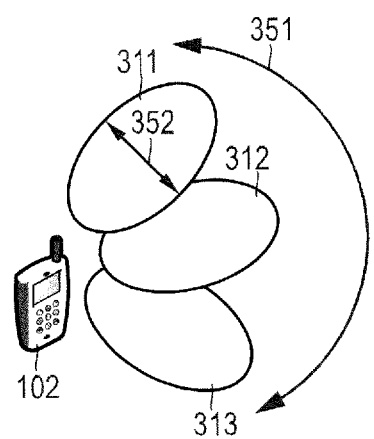
FIG. 9 schematically illustrates candidate beams supported by a UE according to various examples.

FIG. 9 illustrates aspects with respect beams 311-313 supported by the UE 102. For example, the candidate beams 301-309 may be indicated to the BS 101 as the beamforming capability. For example, the spatial arrangement—e.g., relative with respect to each other or relative with respect to reference frame—of the candidate beams 311-313 may be indicated to the BS 101 as the beamforming capability. For example, the count of the beams 311-313 may be indicated to the BS 101 as the beamforming capability. For example, the antenna patch associated with the candidate beams 311-313 may be indicated to the BS 101 is the beamforming capability.

The beams 311-313 have a larger beam width if compared to the beams 301-309. The opening angle 351 achievable using the beams 311-313—e.g., in a beam sweep—according to the example of FIG. 9, nonetheless, corresponds to the opening angle 351 achievable using the beams 301-309 according to the example of FIG. 8. For example, the beams 311-313 may be associated with antennas 1024 arranged on a common antenna patch 1023, because they are all arranged in the same direction (left of the UE 102 in FIG. 9).

Figure 10:
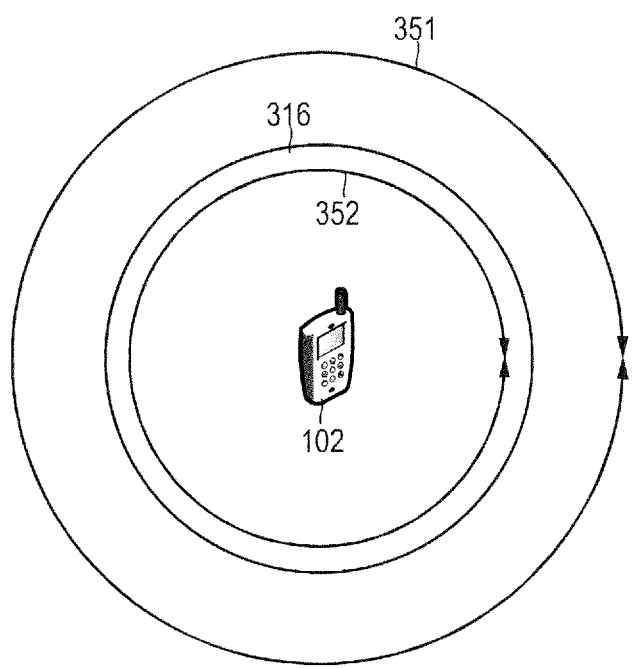
FIG. 10 schematically illustrates a candidate beam supported by a UE according to various examples.

FIG. 10 illustrates aspects with respect to a candidate beam 316 supported by the UE 102. The candidate beam 316 may be indicated to the BS 101 as the beamforming capability.

The beam 316 is omnidirectional such that a 360° opening angle 351 is achievable using the beam 316. Here, the beam width 352 corresponds to the opening angle 351.

Based on the beamforming capability which is indicative of the candidate beams 301-309, 311-313, 316, the BS 101 may then select one or more beams for implementing a beam sweep 399. The particular beam or beams which is or are selected for implementing the beam sweep 399 may depend on the situation, e.g., on a quality of communicating payload data.

Figure 11:
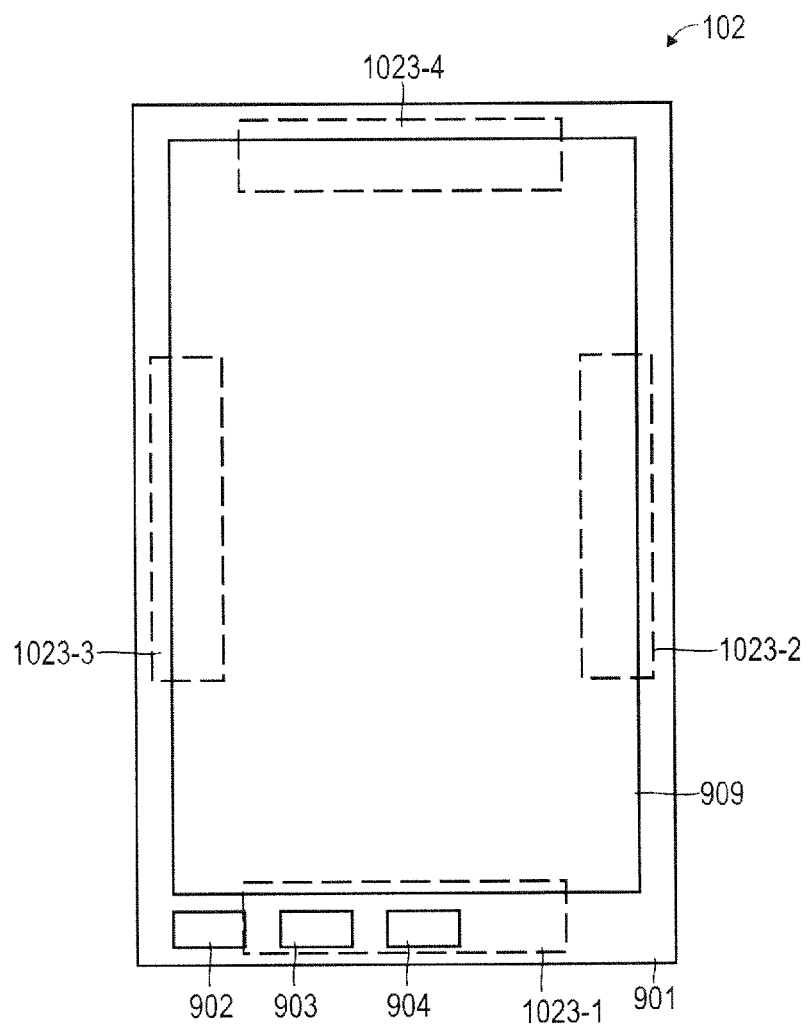
FIG. 11 schematically illustrates antenna patches of a UE according to various examples.

FIG. 11 illustrates aspects with respect to the UE 102. In particular, FIG. 11 is a top view of the UE 102. The UE 102 includes a display 909, a housing 901, and buttons 902-904. In FIG. 11, it is illustrated that different antenna patches 1023-1-1023-4 are arranged at different sides of the housing 901. Therefore, beams defined by the different patches 1023-1-1023-4 will have effectively different orientations; for example, beams transmitted by using antennas of the patch 1023-1 may be orientated effectively towards the bottom of FIG. 11; while beams transmitted by using antennas of the patch 1023-4 may be orientated effectively towards the top of FIG. 11. Each antenna patch 1023-1-1023-4 defines a phased array of antenna elements (FIG. 11 does not illustrate the antenna elements for sake of simplicity).

In various examples, it is possible to indicate candidate beams by means of indication of the antenna patches 1023-1-1023-4. Then, the BS 101 may select between different antenna patches 1023-1-1023-4 when determining configuration information for one or more beams.

Figure 12:
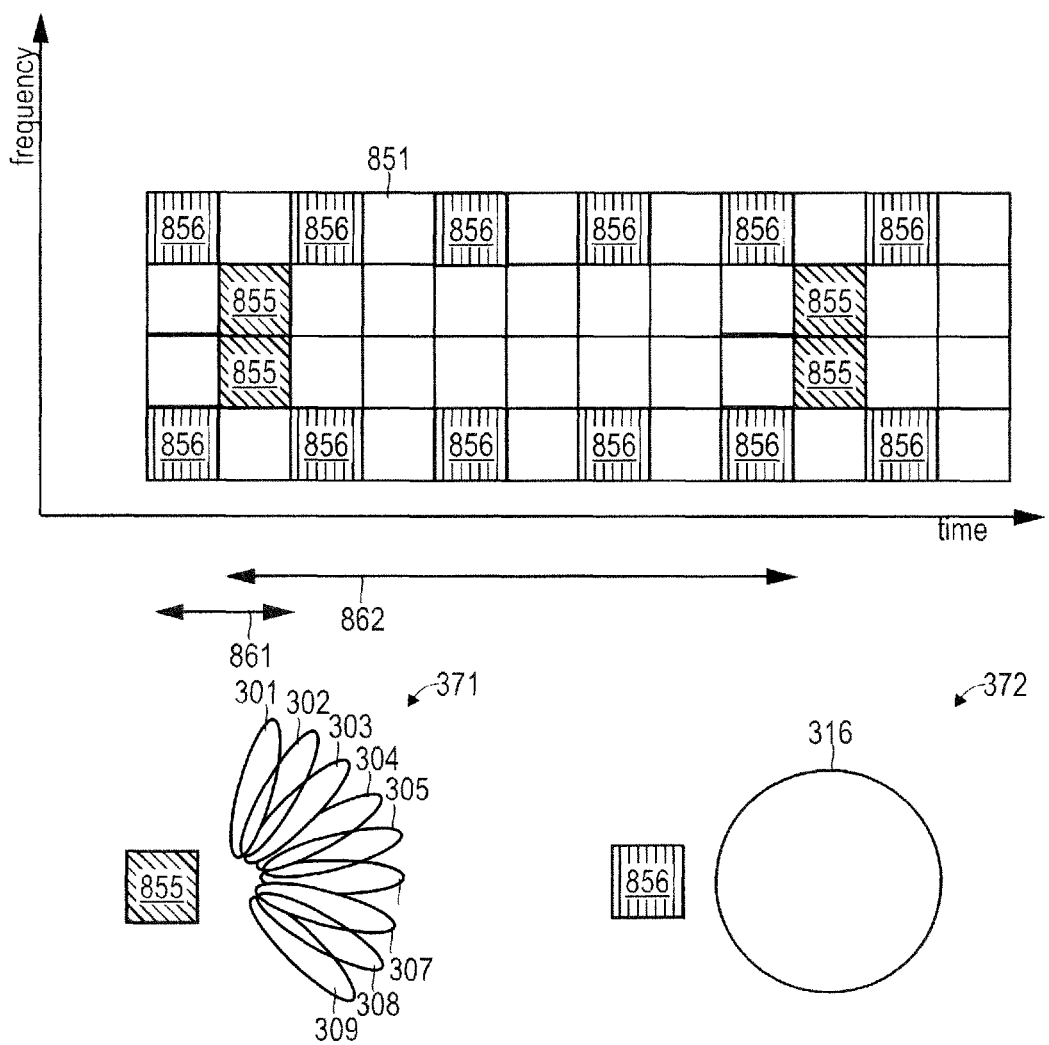
FIG. 12 schematically illustrates resources allocated for communicating one or more pilot signals on a plurality of beams according to various examples.

This indication of antenna patches may be one technique of using a beam group for indication of one or more beams with one indicator, i.e., of defining subsets. In such implementation a subset may be associated with multiple beams transmitted via antenna elements in the same antenna patch. Alternatively a subset may be associated with beams, where different beams of the same subset are associated with different antenna patches. This is illustrated by the following example: If a UE has patches A, B and C and each patch can form two different beams (A-a, A-b, B-a, B-b, C-a, C-b) one may form subsets, e.g., as example (I) subset X: A-a and A-b. subset Y: B-a, B-b. subset Z: C-a, C-b; or as example (II) Subset X: A-a, B-a, C-a. subset Y: A-b, B-b, C-b. In example (I), there is one subset per antenna patch. In example (II), each beam in a subset is associated with a different antenna patch FIG. 12 illustrates aspects with respect to time-frequency resources 855, 856 that may be allocated to transmitting one or more pilot signals on one or more beams of a beam sweep. Tithe resources 855, 856 can be provided from the BS 101 to the UE 102 by means of the configuration information for the one or more beams.

In FIG. 12, a time-frequency resource grid 851 is illustrated. Different resource elements of the time-frequency resource grid 851 may be defined in frequency domain by subcarriers of a Orthogonal Frequency Division Multiplex (OFDM) modulation used for communicating on the wireless link 111 and may be defined by a symbol duration of the modulation in time domain. As illustrated in FIG. 12, certain resources 855, 856—corresponding to a subset of all resource elements of the time-frequency resource grid—are allocated to communicating of at least one pilot signal on one or more beams of a beam sweep 399.

In some examples, it would be possible that different resources are allocated for different beams (not illustrated in FIG. 12). In other words, it would be possible that the configuration information is indicative of, for each beam of one or more beams, at least one resource of the plurality of resources allocated to said communicating of the at least one pilot signals on the respective beam, wherein different resources are allocated to said communicating of the at least one pilot signal on different beams. Then, it may not be required to provide logic for selecting the appropriate resource at the UE: rather, the resources may be selected by the BS 101 on a per-beam basis.

Differently, in FIG. 12, the resources 855 are allocated for a plurality of beams 301-309, the beams 301-309 forming a subset 371 of all beams 301-309, 316 to be used by the UE 102 for communicating at least one pilot signal; while the resources 856 are allocated for the beam 316, the beam 316 forming another subset 372 of all beams 301-309, 316 to be used by the UE 102 for communicating at least one pilot signal. As will be appreciated from FIG. 12, the BS 101 does not provide configuration information for the candidate beams 311-313 such that in this example the US 102 is not to communicate one or more pilot signals on the beams 311-313; rather, the BS 101 has selected the beams 301-309, 316 for communicating the at least one pilot signal.

Within the resources 855, the UE 102 is free to select, for each respective beam 301-309 of this subset 371, at least one resource for communicating of the at least one pilot signal on the respective beam 301-309. This may be done based on an association between the respective beam 301-309 and the respective subset 371; such an association may be explicitly included in the configuration information. For example, each beam 301-309, 316 to be used by the UE 102 may have a corresponding index and each index may be associated with a given subset 371, 372. Then, the resources 855, 856 provided to the UE 102 may again be associated with the various subsets 371, 372. For example, the association may also be implemented by a pointer which indicates, for each beam of the one or more beam, which resource or resources are to be used; then, the same pointer may be used for multiple beams associated with the same subset which share common resources. This implicitly indicates the subset. As will be appreciated, the resources in the example of FIG. 12 are allocated on a per-subset 371, 372 basis; i.e., different resources 855, 856 are allocated to different subsets 371, 372 of beams 301-309, 316.

There are different criteria that may be used for defining subsets 371, 372. Example criteria for grouping beams into a subset 371, 372 include: a relative spatial arrangement of the respective one or more beams; beam widths of the respective one or more beams; and antenna patches associated the respective one or more beams. For example, beams may be grouped into a common subset 371, 372 if they have comparable or corresponding properties.

The resources 855 and 856 are re-occurring, i.e., semi-persistently scheduled. A certain frequency of occurrence 862 of communicating at least one pilot signal on the beam 816 is thereby defined. This frequency of occurrence 862 is smaller than a frequency of occurrence 861 of communicating at least one pilot signal on the beams 301-309. Such a technique ensures that from time to time a global beam sweep 399 is performed. This facilitates robust communication of payload data.

As will be appreciated, where the BS 101 allocates the resources 855 and 856, it is possible to implement measurement gaps if required by a respective indicator included in the beamforming capability of the UE 102. For example, if the UE 102 is not capable of communicating at least one pilot signal on one or more beams while contemporaneously communicating payload data, it would be possible to implement the measurement gaps such that contemporaneously with the resources 855 and 856 no payload data is transmitted. The resources 855 and 856 may be taken into account when scheduling communication of the payload data.

In the example of FIG. 11, each subset 371, 372 may define a corresponding beam sweep. Thus, it would be possible that one or more pilot signals are communicated on all beams 301-309 of the subset 371 to complete the respective beam sweep 399; before the beam sweep 399 associated with the subset 371 is executed anew. Such techniques provide the BS 101 with the capability of grouping candidate beams 301-309, 311-313, 316 into subsets 371, 372, to thereby define beam sweeps. This helps to tailor the opening angles 351 of the beam sweeps 399. For example, by grouping offset beams 301-309 into a common subset 371 which defines a beam sweep 399, the opening angle 351 is comparably large. As the opening angle of the beams 311-313 corresponds to the opening angle 351 of the beams 301-309, it is not necessary to select also the candidate beams 311-313 for communication of payload signals.

Figure 13A:
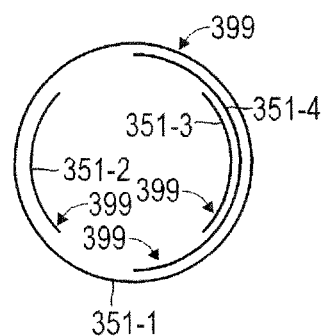
FIG. 13A schematically illustrates opening angles associated with a plurality of beam sweeps according to various examples.

FIG. 13A illustrates aspects with respect to opening angles 351-1-351-4 of corresponding beam sweeps 399. The beam sweeps 399 may be tailored by grouping candidate beams 301-309, 311-313, 316 supported by the UE 102 into respective subsets. Each beam sweep 399 may include one or more beams. As will be appreciated, different beam sweeps 399 have different opening angles 351-1-351-4 and by appropriately employing different beam sweeps 399 effective sounding of the wireless link 111 is possible. The beam sweeps 399 and their opening angles 351-1-351-4 can be tailored by using the configuration information.

Figure 13B:
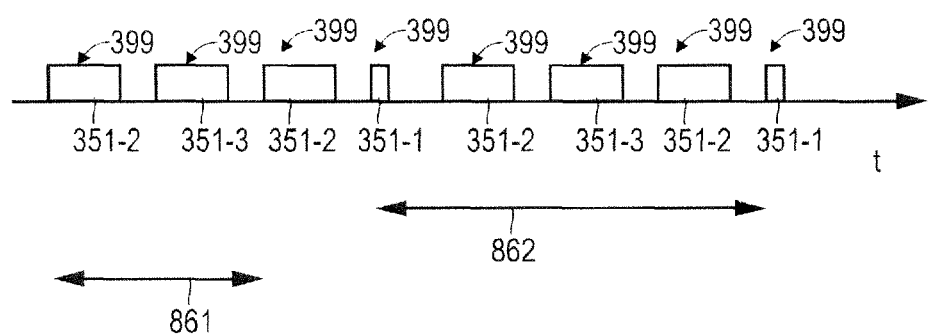
FIG. 13B schematically illustrates an exemplary timing of a plurality of beam sweeps set in accordance with configuration information.

FIG. 13B illustrates aspects with respect to the timing of different beam sweeps 399. In FIG. 13, the frequency of occurrence of the different beam sweeps 399 is configured using the configuration information provided by the BS 101 to the UE 102. As will be appreciated, the frequency of occurrence 861 of the local beam sweep 399 having the comparably small opening angle 351-1 is larger than the frequency of occurrence 862 of the global beam sweep 399 having the omnidirectional opening angle 351-1.

From FIG. 13B it is apparent, that the duration of each beam sweep 399 is comparably limited; this avoids drifts in the link performance during each beam sweep.

Figure 14:
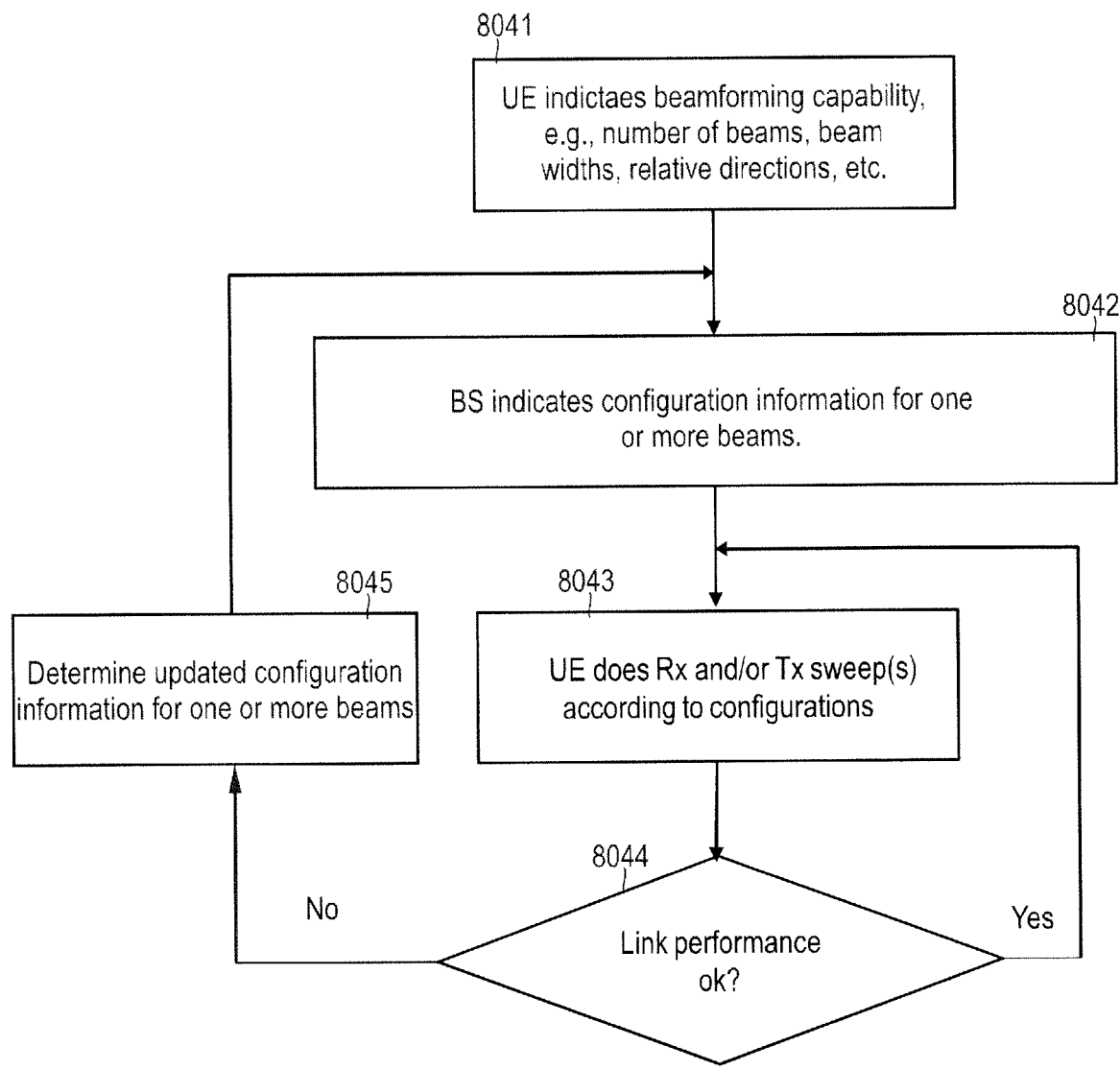
FIG. 14 is a flowchart of a method according to various examples.

FIG. 14 is a flowchart of a method according to various examples.

In block 8041, the UE indicates its beamforming capability using an UL control message. The beamforming capability may be indicative of the candidate beams 301-309, 311-313, 316 that the UE 102 could use for communicating one or more pilot signals. For example, the beamforming capability may be indicative of the relative spatial arrangement of the candidate beams 301-309, 311-313, 316 and/or their beam widths 352 and/or the respective antenna patch 1023, 1023-1-1023-4 associated with the candidate beams 301-309, 311-313, 316.

In block 8042, the BS 102 then indicates the configuration information for one or more beams that are to be used for communicating one or more pilot signals.

The configuration information may be indicative of one or more beams 301-309, 316 selected from the plurality of candidate beams 301-309, 311-313, 316. For this purpose, beam indices may be employed. For example, the candidate beams may be associated with beam-specific indices and then the selected one or more beams may be signaled by including the respective beam indices in the configuration information.

The configuration information may be indicative of a timing used for communicating at least one pilot signal on one or more beams.

For example, the configuration information may be indicative of a plurality of re-occurring resources 851, 852 in time domain and/or frequency domain allocated to communicating of at least one pilot signal. As such, the configuration information may be indicative of a plurality of re-occurring resources to be used for one or more beam sweeps for pilot signal transmission.

Thereby, it is possible to tailor the frequency of occurrence of certain beams to be used in the one or more beam sweeps.

In some scenarios, the configuration information may be indicative of associations between the beams of the one or more beams and subsets 371, 372. For example, indices may be used to differentiate between different subsets 371, 372. In such a scenario, it is possible to indicate resources 855, 856 to be used for communicating one or more pilot signals on the one or more beams on a per-subset basis. The UE 102 can select the particular resource from the available resources 855, 856 by taking into account the association between beams and subsets 371, 372. This facilitates efficient resource scheduling with low overhead.

In some examples, it may be possible that different subsets 371, 372 correspond to different beam sweeps 399. This may facilitate prioritization between different beam sweeps 399. For example, a frequency of occurrence of global beam sweeps 399 and local beam sweeps 399 may be set appropriately. In 8043, the one or more beam sweeps 399 are carried out.

Then, in 8044 it is checked whether the performance of the wireless link 111—e.g., associated with the quality of communicating payload data—is sufficient. If this is the case, then there is no need to provide updated configuration information for one or more beams from the BS 101 to the UE 102; rather, the legacy configuration information may be re-used in another iteration of 1043. Otherwise, if the link performance of the wireless link 111 significantly deteriorates, it may be required to provide an updated configuration information for one or more beams, 8045. For example, new or other beam sweeps 399 may be defined by appropriately grouping the available candidate beams into subsets. For example, a switch from local beam sweeps 399 to a more global beam sweep may be implemented. They are different strategies conceivable.

Summarizing, above, techniques have been illustrated which enable the UE to inform the network about a beamforming capability. For example, the UE may inform the network of a set of candidate beams that are available for transmitting and/or receiving one or more pilot signals by the UE. For example, the UE may inform the network on the relative UE beam directions for such beams. Such techniques are based on the finding that when performing transmission of UL one or more pilot signals, it would be beneficial for the network to be aware of the expected UE transmission specifications for the beams used during the transmission of the UL one or more pilot signals. If certain beams are used, the transmission of the UL one or more pilot signals may be local—i.e., limited to a certain beam direction—, or a global beam sweep may be implemented by selecting beams that result in a more or less omnidirectional transmission of UL one or more pilot signals.

Then, the BS may transmit to the UE configuration information. The configuration information may be indicative of beam indices for UL pilot signal transmission, to thereby control the expected opening angle. Alternatively or additionally, the BS may indicate a requirement to the UE to select the UE antennas to achieve a omnidirectional transmission using resources allocated by the network. Hence, for supporting the UE when configuring a beam sweep, according to various examples, certain decision logic of the beam management is provided at the BS. The network shall be able to configure communication of at least one pilot signal in order to control whether the corresponding beam sweeps are global or local, i.e., have omnidirectional or directed opening angles.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while various techniques have been described with respect to the BS implementing remote control of the beam management at the UE, in some examples, it would also be possible to implement remote control of the beam management at the UE through another network node such as a relay node.

For example, above various techniques have been described in connection with subsets into which at least one beam of one or more beams used for communicating at least one pilot signal are grouped. It is possible that allocation of resources for said communicating of the at least one pilot signal is implemented on a per-subsets basis; i.e., communicating of the at least one pilot signal on beams of different subsets may be implemented using different resources. In some examples, it would be possible to directly implement such resource allocation on a per-subset basis without explicitly signalling the association between beams and subsets. Hence, the forming of subsets may be internal logic to the network node such as the BS for the purpose of allocation of resources, but the UE may not be made aware of the subsets.

In some examples, it would also be possible that the grouping of beams into subsets is performed by the UE. Then, the UE may signal a plurality of candidate beams by associations with subsets. As already illustrated above, here, the subsets may be defined with respect to, e.g., antenna patches, etc.

Generally, the subsets of beams may also be labelled beam groups.

The invention claimed is:

1. A method of operating a network node, comprising:
receiving, from a communication device, a beamforming capability of the communication device, the beamforming capability being indicative of a capability to group one or more beams based on a relative spatial arrangement,
determining configuration information for one or more beams of the communication device based on the beamforming capability,
transmitting, to the communication device, the configuration information for the one or more beams of the communication device, and
communicating at least one pilot signal on one or more beams corresponding to the one or more beams of the communication device in accordance with the configuration information,
wherein the configuration information is indicative of, for each beam of the one or more beams, at least one resource of a plurality of resources in at least one of time domain and frequency domain and allocated to said communicating of the at least one pilot signal on the respective beam, and
wherein at least partly different resources are allocated to said communicating of the at least one pilot signal on at least two different beams of the one or more beams.

2. The method of claim 1,
wherein the plurality of resources are re-occurring in time domain.

3. The method of claim 1, further comprising:
selecting, by the communication device, for each beam of the one or more beams, at least one resource from the plurality of resources for said communicating of the at least one pilot signal on the respective beam.

4. The method of claim 1,
wherein subsets comprise the one or more beams,
wherein the configuration information is indicative of, for each subset, at least one resource allocated to said communicating of the at least one pilot signal on the one or more beams of the respective subset,
wherein optionally at least partly different resources are allocated to said communicating of the at least one pilot signal on the one or more beams of at least two different subsets.

5. The method of claim 4,
wherein the configuration information is indicative of associations between each beam of the one or more beams and the subsets wherein the method further comprises:
    selecting, by the communication device, for each beam of the one or more beams, at least one resource of the plurality of resources for said communicating of the at least one pilot signal on the respective beam depending on the association between the respective beam and a respective subset.
6. The method of claim 4,
wherein the subsets are formed based on at least one of the following: a relative spatial arrangement of the one or more beams; beam widths of the one or more beams; and antenna patches associated the one or more beams.
7. The method of claim 4,
wherein a first frequency of occurrence of resources allocated to said communicating of the at least one pilot signal on the one or more beams of a first subset is different from a second frequency of occurrence of the resources allocated to said communicating of the at least one pilot signal on the one or more beams of a second subset.
8. The method of claim 4,
wherein the at least one pilot signal is communicated in one or more beam sweeps defined by the subsets.
9. The method of claim 1, further comprising:
communicating, between the network node and the communication device, payload data, and
depending on the beamforming capability: selectively implementing time gaps for said communicating of the payload data in accordance with the resources allocated to said communicating of the at least one pilot signal on one or more beams.
10. The method of claim 1,
wherein the beamforming capability is indicative of a plurality of candidate beams supported by the communication device.
11. The method of claim 10,
wherein the beamforming capability is indicative of at least one of the following: a relative spatial arrangement of the plurality of candidate beams with respect to each other or with respect to a reference frame; beam widths of the plurality of candidate beams; antenna patches optionally associated with the plurality of candidate beams;
and a relative spatial arrangement of the antenna patches.
12. The method of claim 1,
wherein the configuration information is indicative of a temporal sequence of the one or more beams within a beam sweep.
13. The method of claim 1, further comprising:
communicating payload data,
wherein the configuration information is determined based on a quality of said communicating of the payload data.
14. The method of claim 1, further comprising:
communicating payload data on at least one beam, the at least one beam being selected based on a receive property of the at least one pilot signal.
15. The method of claim 1,
wherein the configuration information is indicative of at least one of the following: an opening angle of the one or more beams; and a beam width of the one or more beams.
16. The method of claim 1,
wherein the configuration information is indicative of whether a global beam sweep is to be implemented by the one or more beams.

17. A method of operating a communication device, comprising:
    transmitting, to a network node, a beamforming capability of the communication device, the beamforming capability being indicative of a capability to group one or more beams based on a relative spatial arrangement,
    receiving, from the network node, a configuration information for one or more beams of the communication device, and
    communicating at least one pilot signal on the one or more beams of the communication device and in accordance with the configuration information,
    wherein the configuration information is indicative of, for each beam of the one or more beams, at least one resource of a plurality of resources in at least one of time domain and frequency domain and allocated to said communicating of the at least one pilot signal on the respective beam, and
    wherein at least partly different resources are allocated to said communicating of the at least one pilot signal on at least two different beams of the one or more beams.
18. A network node comprising at least one processor configured to perform:
    receiving, from a communication device, a beamforming capability of the communication device, the beamforming capability being indicative of a capability to group one or more beams based on a relative spatial arrangement,
    determining configuration information for one or more beams of the communication device based on the beamforming capability,
    transmitting, to the communication device, the configuration information for the one or more beams of the communication device, and
    communicating at least one pilot signal on one or more beams corresponding to the one or more beams of the communication device and in accordance with the configuration information,
    wherein the configuration information is indicative of, for each beam of the one or more beams, at least one resource of a plurality of resources in at least one of time domain and frequency domain and allocated to said communicating of the at least one pilot signal on the respective beam, and
    wherein at least partly different resources are allocated to said communicating of the at least one pilot signal on at least two different beams of the one or more beams.
19. A communication device comprising at least one processor configured to perform:
    transmitting, to a network node, a beamforming capability of the communication device, the beamforming capability being indicative of a capability to group one or more beams based on a relative spatial arrangement,
    receiving, from the network node, a configuration information for one or more beams of the communication device, and
    communicating at least one pilot signal on the one or more beams of the communication device and in accordance with the configuration information,
    wherein the configuration information is indicative of, for each beam of the one or more beams, at least one resource of a plurality of resources in at least one of time domain and frequency domain and allocated to said communicating of the at least one pilot signal on the respective beam, and wherein at least partly different resources are allocated to said communicating of the at least one pilot signal on at least two different beams of the one or more beams.

* * * * *